United States Patent [19]

Tachi

[11] 4,300,171

[45] Nov. 10, 1981

[54] MAGNETIC RECORDING MEDIUM DIRECTION SENSING

[75] Inventor: Katsuichi Tachi, Ebina, Japan

[73] Assignee: Sony Corporation, Tokyo, Japan

[21] Appl. No.: 25,205

[22] Filed: Mar. 29, 1979

[30] Foreign Application Priority Data

Mar. 31, 1978 [JP] Japan ................................ 53-37812

[51] Int. Cl.³ ...................... H04N 5/795; G11B 27/30
[52] U.S. Cl. ....................................... 360/10; 360/72.2
[58] Field of Search ........................ 360/10, 11, 14, 41,
360/49, 72.1, 72.2

[56] References Cited

U.S. PATENT DOCUMENTS

| | | | |
|---|---|---|---|
| 3,739,086 | 6/1973 | Heather | 360/72.2 |
| 4,040,100 | 8/1977 | Chan | 360/14 X |
| 4,159,480 | 7/1979 | Tachi | 360/14 X |
| 4,167,759 | 11/1979 | Tachi | 369/14 |

Primary Examiner—Alfred H. Eddleman
Assistant Examiner—Donald McElheny, Jr.
Attorney, Agent, or Firm—Hill, Van Santen, Steadman, Chiara & Simpson

[57] ABSTRACT

Apparatus for reproducing a video signal from a magnetic tape in which each field of the video signal is recorded as a respective slant video track on the tape, and a frame code signal identifying the frame of the video signal and a field code signal identifying the field of the video signal are also recorded in each video track, the field code signal being a bit which changes in level between each field and the next following field, the apparatus including a direction sensing circuit for reproducing the least significant bit of the frame code and the field code bit, discriminating the field code bit with the least significant bit of the frame code as a reference, and producing a signal indicating the transport direction of the tape in dependence on this discrimination.

4 Claims, 44 Drawing Figures

MAGNETIC RECORDING MEDIUM DIRECTION SENSING

CROSS-REFERENCE TO RELATED APPLICATION

My copending application Ser. No. 844912 corresponding to Japanese application no. 128991/76 now U.S. Pat. No. 4,159,480 which issued June 26, 1979, discloses a method of inserting an address signal in a video signal.

BACKGROUND OF THE INVENTION

1. Field of the Invention

The present invention relates to magnetic recording medium direction sensing.

2. Description of the Prior Art

In order to edit video signals rapidly and precisely it has been proposed to record an address signal on a magnetic tape in addition to the video and audio signal. Various coded address signals have been proposed, but the Socity of Motion Picture and Television Engineers (SMPTE) time code signal is recommended as an American Nation Standard and the European Broadcasting Union (EBU) time code signal is recommended as a standard code for 625 line/50 field television tape recordings. These two time code signals are recorded on a magnetic tape along a longitudinal track, and read-out of the signals can be achieved at tape speeds from slow to high speed. However, in cases where the magnetic tape is stopped or is transported at very low speed, the reproduction of the time code signals becomes impossible. In fact, on editing a magnetic tape using a video tape recorder (VTR), it is very advantageous to be able to choose individual frames presented visually at very low tape speeds, but with the above-mentioned time code signals the use of very low tape speeds means that the address of a chosen frame cannot readily be known.

In the above-mentioned application there is described an address signal which is inserted into the video signal itself. This address signal is called a vertical interval time code (VITC) signal. The VITC signal is recorded on the magnetic tape as part of the video track, so that the VITC signal can always be reproduced by a rotary magnetic head regardless of the tape transport speed and direction.

Time code signals, such as the SMPTE signal, recorded longitudinally on a magnetic tape have a synchronising word to indicate the tape transport direction, so that the address signal can be correctly decoded. Therefore, after reproducing one word of an SMPTE signal it is immediately possible to produce the next address to be reproduced merely by adding or subtracting one to or from the present address.

The VITC signal on the other hand is scanned by a rotary magnetic head which is always moving in the same direction relative to the video tracks in which the video signal is recorded on the magnetic tape, so the VITC signal has no synchronising word therein. It is not therefore possible to determine the tape transport direction from the VITC signal corresponding to one video track. This is a disadvantage, particularly where it is required to generate an address signal by calculation. This requirement may arise as follows:

Firstly, to stop the magnetic tape at a predetermined address exactly, a calculated address signal is used to determine the address of the video track next before the video track having the predetermined address.

Secondly, if drop-out results in loss of the VITC signal in the reproduced signal, a VITC signal calculated from a preceeding VITC signal not lost due to drop-out can be used in place of the lost VITC signal.

Thirdly, to avoid problems caused by drop-out, it is usual, when transcribing from a playback VTR to a recording VTR, to insert a new, calculated, VITC signal in the recorded video signal.

SUMMARY OF THE INVENTION

One object of the present invention is to provide apparatus for determining the transport direction of magnetic medium.

Another object of the present invention is to provide a direction sensing apparatus for a magnetic medium, the apparatus providing an output derived from an address signal reproduced from the magnetic medium, from which output an address signal subsequently to be reproduced can be calculated.

Another object of the present invention is to provide a direction sensing apparatus for a magnetic medium, the apparatus providing an output derived from an address signal reproduced from a video track of the magnetic medium, from which output the address signal of the next adjacent video track can be calculated.

According to the present invention there is provided apparatus for reproducing a video signal from a record medium in which each field of the video signal is recorded as a respective video track on the record medium and a code signal identifying at least the frame of the video signal is also recorded in each video track, said code signal including a bit which changes in level between each frame and the next following frame, the apparatus including a direction sensing circuit for discriminating said code signal and producing a signal indicating the transport direction of said record medium in dependence on the discrimination.

The above, and other objects, features and advantages of this invention, will be apparent in the following detailed description of illustrative embodiments which is to be read in connection with the accompanying drawings.

BRIEF DESCRIPTION OF THE DRAWINGS

FIGS. 8B and 8K, 9A to 9H and 10A and 10D are waveform diagrams for explaining the operation of the circuits of FIGS. 6 and 7.

DESCRIPTION OF THE PREFERRED EMBODIMENTS

Figure 1:
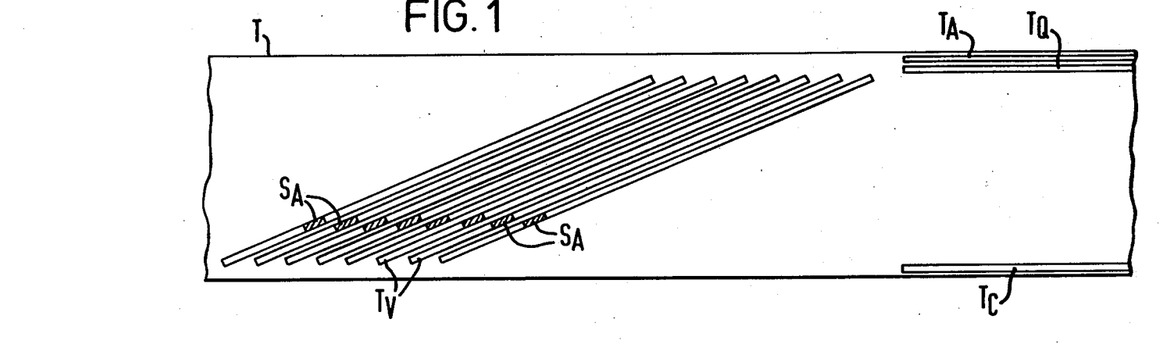
FIG. 1 shows the arrangement of recording tracks on a magnetic tape.

Referring to FIG. 1, a magnetic tape T has slant video tracks $T_V$ each of which has recorded therein a video signal of one field, and three longitudinal tracks $T_A$, $T_Q$ and $T_C$. The track $T_A$ is for the audio signal, the track $T_Q$ is for cue signals and in particular may have an SMPTE or EBU time code signal recorded therein, and the track $T_C$ is for control signals. A VITC address signal $S_A$, identifying the video signal of each track $T_V$ is inserted in each video signal as a digital signal and the VITC signals $S_A$ are recorded in the tracks $T_V$ as indicated by hatched portions in FIG. 1.

Each VITC signal includes synchronising signals which are inserted in the VITC signal at every ten bits. Thus by correcting the phase of a clock at every predetermined number of bits by utilising the synchronising signals upon read-out, the address contained in the VITC signal can be read out precisely even if the bit frequency of the VITC signal varies by jitter, skew or other noise factors or by the variation of the horizontal frequency in a slow or still motion reproduction mode. Moreover, the VITC signal also includes an error check code to avoid read-out error.

Figure 2A:
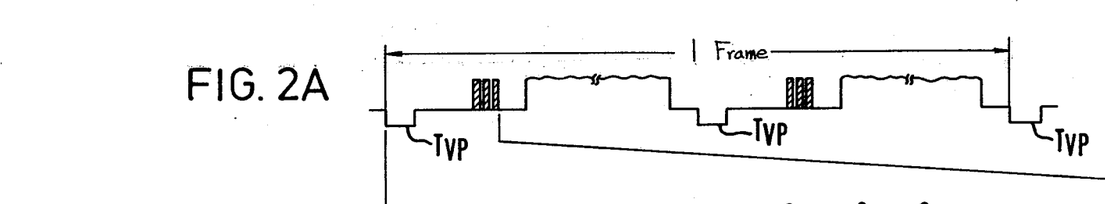
FIGS. 2A to 2F are waveform and timing diagrams for describing the recording of a VITC signal.
Figure 2B:
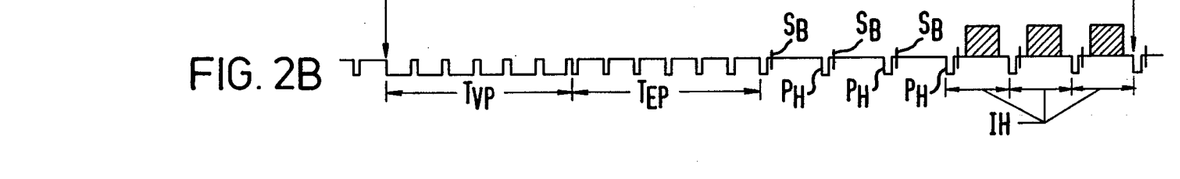

As shown by hatched portions in FIGS. 2A and 2B which show a record pattern of signals on the magnetic tape, now shown, one VITC signal is inserted into one horizontal line period of the suppressed line periods within the vertical blanking period or vertical interval, not of course using those portions which comprise a vertical synchronising pulse period $T_{VP}$ or an equalising pulse period $T_{EP}$. The VITC signal is inserted in the period after the burst signals $S_B$ and it is desired that the same VITC signal be inserted repeatedly into three successive horizontal line periods. The abovementioned suppressed line periods correspond to the 10th to 21st line periods in the NTSC system.

Figure 2C:
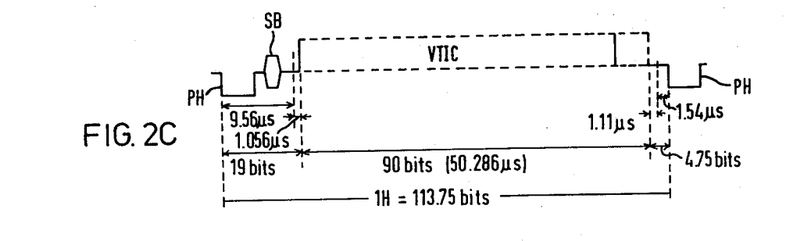

In FIG. 2C one horizontal line period 1H is shown including a horizontal pulse $P_H$ and a burst signal $S_B$. The interval from 9.56 microseconds after the front edge of a horizontal pulse $P_H$ to 1.54 microseconds before the front edge of the next horizontal pulse $P_H$ is the horizontal blanking period.

Still considering the NTSC system, the bit frequency $f_B$ of the VITC signal is selected as the colour subcarrier frequency $f_{sc}$ which equals 3.58 MHz, divided by one-half, that is, approximately 1.79 MHz. Thus, one horizontal period 1H corresponds to 113.75 bits. For the VITC signal 90 bits only are used, numbered 0 to 89, so the first 1.056 microseconds and the last 1.11 microseconds of the horizontal blanking period are not used.

Figure 2D:
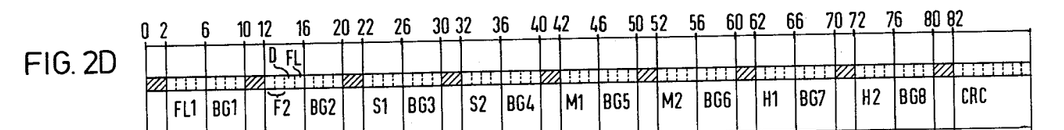

Now, referring to FIG. 2D, the arrangement of the VITC signal will be explained. Synchronising signals each consisting of two bits are placed at the beginnning of the VITC signal and at every ten bits thereafter as shown by hatched portions in FIG. 2D. Thus, the bits 0, 1, 10, 11, 20, 21, 30, 31, 40, 41, 50, 51, 60, 61, 70, 71, 80 and 81 are synchronising bits. Time address bits correspond in arrangement to that of the SMPTE time code. The bits 2 to 5 (frame code F1) are units of frames, 12 and 13 (frame code F2) are tens of frames, 22 to 25 (S1) are units of seconds, 32 to 34 (S2) are tens of seconds, 42 to 45 (M1) are units of minutes, 52 to 54 (M2) are tens of minutes, 62 to 65 (H1) are units of hours, and 72 and 73 (H2) are tens of hours. The bit 14 (D) is the drop frame bit, the bit 15 (FL) is a field code, the bits 35, 55, 74 and 75 are unassigned address bits, and the bits 6 to 9 (BG1), 16 to 19 (BG2), 26 to 29 (BG3), 36 to 39 (BG4), 46 to 49 (BG5), 56 to 59 (BG6), 66 to 69 (BG7), and 76 to 79 (BG8) are user bits.

In the first field of each frame the field mark FL is "0" and in the second field it is "1", so field identification can be accomplished. The abovementioned bits total 82. After these 82 bits, there is provided an error check code for the preceding bits, for example, a cyclic redundant check code (CRC code) consisting of 8 bits. In using the CRC code, the data presented between bits 0 and 81 is divided by a predetermined code or polynomical (constant, $x^8+1$) and the remainder is coded into the final 8 bits to form the CRC code. In the decoding process, all the bits, including the CRC code are divided by the predetermined code which is constant and can be expressed by $x^8+1$. The predetermined code as used in the decoding process is the same predetermined code as used in the encoding process. The remainder acts as an indicator of error. If there is a remainder, the information is incorrect, if not, the information is correct.

Figure 2E:
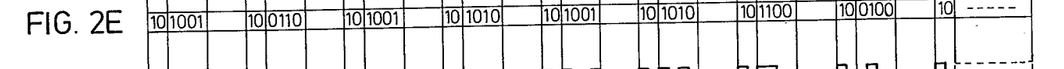
Figures 2F, 2G:
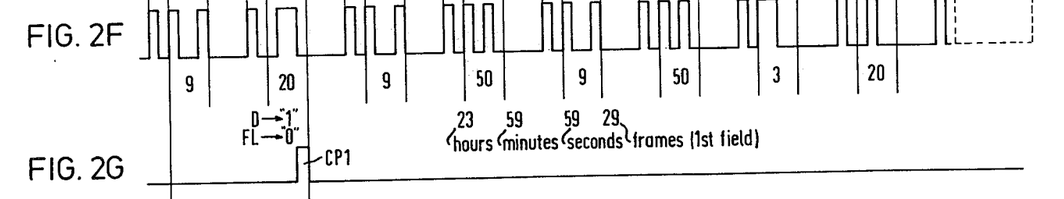
FIGS. 2G and 2H show respective clock pulses used in reproducing the VITC signal.

In FIG. 2E is shown a specific example of a VITC signal and in FIG. 2F is shown the signal waveform. This specific example comprises a time code for 23 hours 59 minutes, 59 seconds, frame 29. The drop frame bit D is "1" and the field code FL is "0", so the address is that of the first field in frame 29.

Figure 2H:
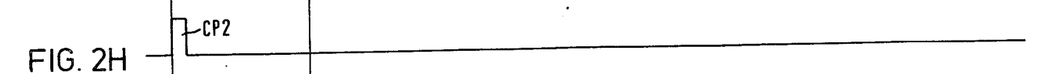
Figure 3:
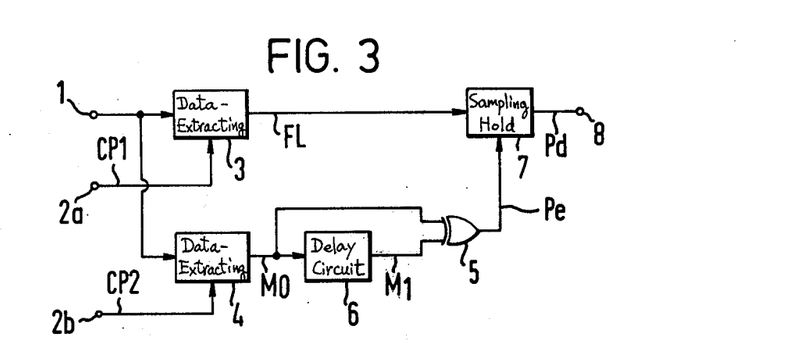
FIG. 3 is a block diagram of a direction sensing circuit.

A direction sensing circuit for sensing the transport direction of a magnetic tape bearing such VITC signals will now be described with reference to FIG. 3. The circuit comprises an input terminal 1 to which a VITC signal separated from a reproduced video signal is applied, and terminals 2a and 2b supplied with clock pulses CP1 and CP2 respectively. Because the rotary reproducing heads of a VTR always scans the video tracks in the same direction, the VITC is always read in the direction from left to right in FIG. 2D independent of the transport direction of the magnetic tape. The clock pulse CP1 (see also FIG. 2G) is generated at the time of the field code FL in the read-out VITC signal, while the clock pulse CP2 (see also FIG. 2H) is generated at the time of the least significant bit Mo in the frame code F1. Although not shown, there is also provided a clock pulse signal the bit frequency of which is phase-synchronised with the horizontal synchronising signal separated from the reproduced video signal. Based upon this clock pulse signal and the reproduced vertical synchronising signal, the clock pulses CP1 and CP2 are produced at the above times. The read-out VITC signal is fed to data-extracting circuits 3 and 4. The data-extracting circuit 3 is so formed that the field code FL at the time of the clock pulse CP1 is extracted and held. The other data-extending circuit 4 is so formed that the least significant bit Mo of the frame code F1 is extracted at the time of the clock pulse CP2 and held. The least significant bit Mo from the data-extracting circuit 4 is applied to one of the input terminals of an exclusive OR-gate 5 and to the input terminal of a delay circuit 6. A pulse signal M1 from the delay circuit 6 is applied to the other input terminal of the exclusive OR-gate 5. The field code FL from the data-extracting circuit 3 is applied to the input terminal of a sampling hold circuit 7. The output from the exclusive OR-gate 5 is used as a sampling pulse Pe for the sampling hold circuit 7. The sampled output from the sampling hold circuit 7 is supplied to an output terminal 8 as a detecting signal Pd. As may be understood from the following description of the operation, the detecting signal Pd becomes "0" upon forward transport and "1" upon reverse transport, and is used to display the transport direction of the magnetic tape, to control calculation of the next address signal, or for any other required purpose.

As described above, since the VITC signal has the field code FL="0" in the first field and FL="1" in the second field of each frame, the field code FL changes in the order of the first and second field, that is from "0" to "1" in the interval of a given frame address during the forward transport, and in the order of the second and first fields, that is from "1" to "0" in the interval of a given frame address during reverse transport. Moreover, if the least significant bit Mo of the frame code F1 is "0" at a given frame address, it becomes "1" at the next frame address and then "0" at the next frame address. That is, the least significant bit Mo becomes "1" and "0" alternately. FIG. 4 shows the time chart for forward transport, and FIG. 5 shows the time chart for reverse transport.

Figures 4A, 4B:
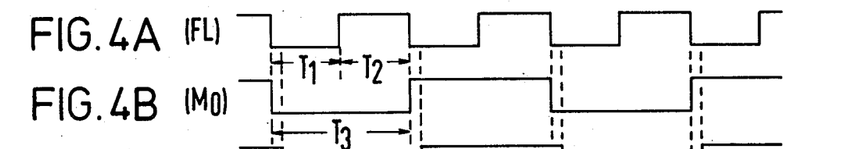
FIGS. 4A to 4E and 5A to 5E are waveform diagrams for explaining the operation of the circuit of FIG. 3.
Figures 4C, 4D:
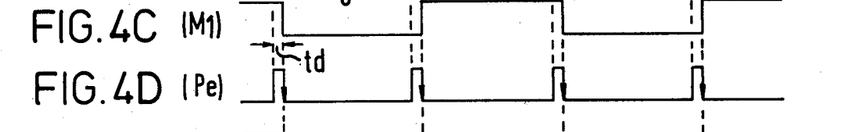
Figure 4E:
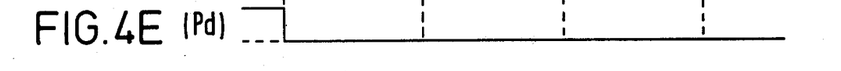

As shown in FIG. 4A, the field code FL becomes "0" during an interval T1 and "1" during the next interval T2. Also, as shown in FIG. 4B, the least significant bit Mo of the frame code F1 becomes "0" during an interval T3 (=T1+T2). This interval T3 corresponds to an interval within which the frame address exists. When the tape transport speed on reproduction is equal to that on recording, the intervals T1 and T2 each become one field interval and hence the interval T3 becomes one frame interval. However, when the tape transport speed on reproduction is lower than that on recording, that is in the case of slow motion reproduction, for example, when the former is one-half of the latter, the intervals T1 and T2 each become two field intervals or one frame interval and hence the interval T3 becomes two frame intervals. The least significant bit Mo is delayed in the delay circuit 6 by a time td to form a pulse signal M1 as shown in FIG. 4C. As shown in FIG. 4D, the sampling pulse Pe from the exclusive OR-gate 5 is generated immediately after the frame address is changed, and in the sampling hold circuit 7 the field code FL is sampled at the falling edge of the sampling pulse Pe. During forward transport the field code FL is "0" without failure at the falling edge of the sampling pulse Pe, so that the detecting signal Pd from the sampling hold circuit 7 becomes "0" as shown in FIG. 4E, to indicate forward transport.

Figures 5A, 5B:
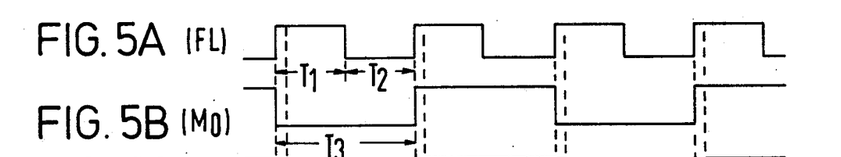
Figures 5C, 5D:
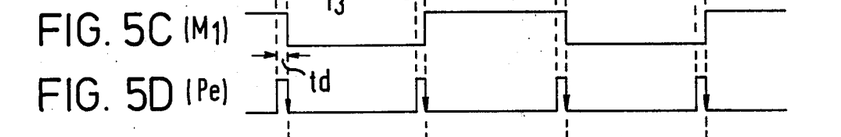
Figure 5E:
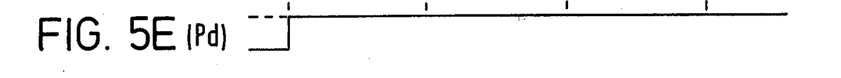

During reverse transport, as shown in FIG. 5A, the field code FL becomes "1" firstly and then "0" during the interval T3 (FIG. 5B) of the given frame address. As in the above case, using the least significant bit Mo of the frame code F1 shown in FIG. 5B and the pulse signal M1 shown in FIG. 4C, there is provided the sampling pulse Pe shown in FIG. 5D at the time immediately after the frame address is changed and the field code FL is sampled at the falling edge of the sampling pulse Pe. Thus, in this case the detecting signal Pd from the sampling hold circuit 7 becomes "1" as shown in FIG. 5E to indicate reverse transport.

In the above example, the transport direction of the magnetic tape is detected by the state of the field code FL immediately after the frame address is changed, but it can be detected by the state of the field code FL immediately before the frame address is changed.

Further, it is also possible (although not shown) that the changing direction of the field address is detected in the interval T3 in which the frame address is constant. That is to say, during forward transport, in the interval of the frame address the changing direction is such that the field code FL is changed from "0" to "1", while during reverse transport the changing direction is such that the field code FL is changed from "1" to "0". In a practical construction, the first value of the field code FL at a given frame address is memorised, and its inverted value and the next value are fed to an AND-gate, or a digital differentiating circuit or the like is used to detect whether the change of the field code is in the rising-up direction or falling-down direction.

Moreover, in the above example, the transport direction of the magnetic tape is detected from the relation between the field code FL and the least significant bit Mo of the frame code F2, but it is possible to derive the two least significant bits from the frame code F1, to use the least significant bit therefrom in place of the field code FL and to use the next least significant bit thereof in place of the least significant bit Mo of the frame code F2 with the same result.

As will be understood from the above description, the transport direction of the magnetic tape can be detected even in the slow motion reproduction mode.

The signals "1" and "0" of the VITC signal are non-return to zero signals of different levels. For example, "0" is selected as the pedestal level and "1" is selected as a signal higher in level than the "0" level, and then the signals are recorded so as to be opposite to the horizontal synchronising pulse viewed from the pedestal level.

Figure 6:
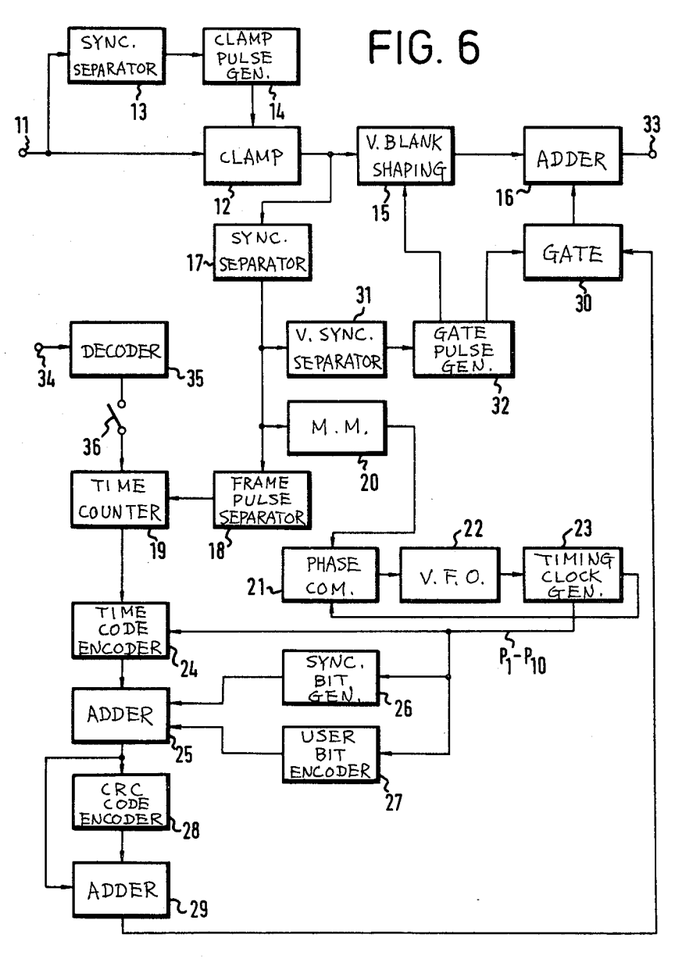
FIG. 6 is a block diagrm of a circuit for producing a VITC signal and recording it on a magnetic tape.

FIG. 6 illustrates a circuit for producing the VITC signal and for recording it on a magnetic tape. An input terminal 11 receives a video signal which is to be recorded. The video signal is fed to a clamp circuit 12 and a synchronising signal separator 13 which separates a synchronising signal from the video signal. There is provided a clamp pulse generator 14 which generates a clamp pulse from the synchronising signal. The video signal from the clamp circuit 12 is fed to an adder circuit 16 via a vertical blanking period shaping circuit 15 and is also fed to a synchronising signal separator 17. Frame pulses are separated by a frame pulse separator 18 which receives an output of the synchronising signal separator 17. The frame pulses are fed to a time counter 19. The output of the synchronising signal separator 17 is fed to a mono-stable multivibrator 20. The mono-stable multivibrator 20 removes an equalising pulse from the signal and generates a signal having a horizontal frequency $f_H$, which is fed to a phase comparator 21. The phase comparator 21, a variable frequency oscillator 22 and a timing clock generator 23 form a phase lock loop (PLL) circuit. The timing clock generator 23 generates a signal having a frequency $f_H$ and clock pulse signals $P_1$ to $P_{10}$ shown in FIGS. 8B to 8K. The signal having a frequency $f_H$ generated by the timing clock generator 23 is fed to the phase comparator 21 to compare with the input from the mono-stable multivibrator 20. The resulting output from the phase comparator 21 is fed to the variable frequency oscillator 22 as a control signal for it. Thus, the clock pulse signals $P_1$ to $P_{10}$ are generated which are synchronised with the horizontal synchronising signal of the video signal.

The clock pulse signal $P_1$ has the same frequency as the colour subcarrier frequency $f_{sc}$. The clock pulse signal $P_2$ has a frequency of $f_{sc}/2$, and one cycle of the clock pulse signal $P_2$ is equal to one bit of the VITC signal. The clock pulse signal $P_3$ has a frequency of $f_{sc}/4$. The timing clock generator 23 is constructed so as to generate the clock pulse signals $P_4$ to $P_6$ by a decimal counter from the clock pulse signal $P_3$, and the clock pulse signals $P_7$ to $P_{10}$ by a hexadecimal counter. The clock pulse signals from the timing clock generator 23 and an output from the time counter 19 are fed to a time code encoder 24 to form a time code (frame code, second code, minute code, and hour code) which is fed to an adder circuit 25. Synchronising signals are formed by a synchronising signal generator 26 by using the pulses from the timing clock generator 23, and user bits are formed at a user bit encoder 27. These synchronising signals and user bits are fed to the adder circuit 25. Accordingly, the output of the adder circuit 25 is the code signal which consists of the time code, the user bits and synchronising signals arranged in the required manner. Then the output of the adder circuit 25 is fed to a CRC code encoder 28. Then the code signal derived from an adder circuit 29 is added to the CRC code derived by the CRC code encoder 28 and fed to a gate circuit 30.

Gate pulses corresponding to three successive horizontal line periods in the vertical blanking period are derived at a gate pulse generator 32 based on a vertical synchronising pulse separated by a vertical synchronising signal separator 31 from the output of the synchronising signal separator 27. Then the gate pulses are fed to the gate circuit 30. Thus, the code signal gated by the gate signal is fed to the adder circuit 16. A code signal which may have been inserted in the vertical blanking period is removed at the vertical blanking period shaping circuit 15 from the video signal by gating by the gate pulse from the gate pulse generator 32. Then the output from the circuit 15 is fed to the adder circuit 16.

Thus, the video signal in which the code signals are inserted into three successive horizontal line periods within the vertical blanking period is derived from an output terminal 33. The output video signal is recorded on the magnetic tape through a signal recording system of a VTR which includes an FM modulator.

It is possible to provide the SMPTE time code from a terminal 34 and to synchronise the SMPTE time code with the VITC signal which is to be inserted into the video signal. The synchronisation can be achieved by presetting the time counter 19 when a preset switch 36 is on. The SMPTE time code is fed through a decoder 35 and the preset switch 36.

Figure 7:
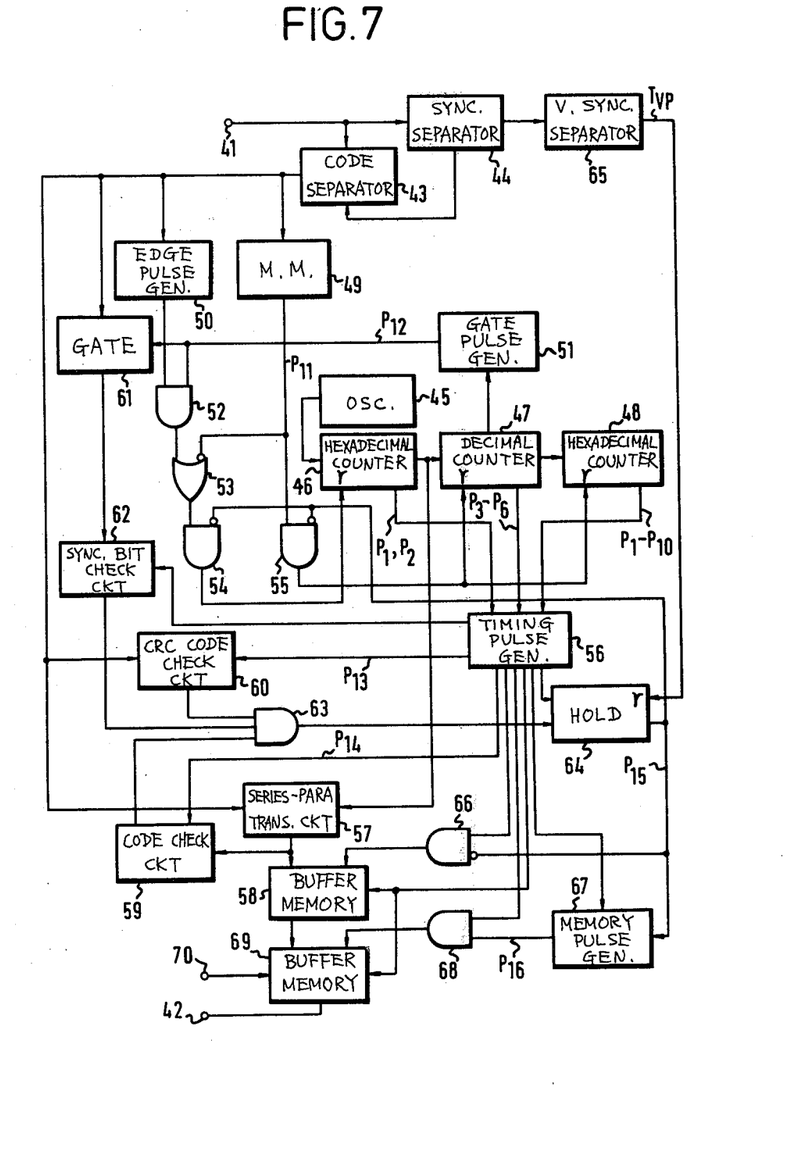
FIG. 7 is a block diagram of a circuit for reading-out a VITC signal from a magnetic tape and decoding the address.
Figure 8B:
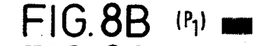
Figure 8C:
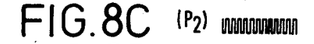
Figure 8D:
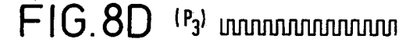
Figure 8E:
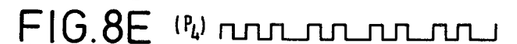
Figure 8F:
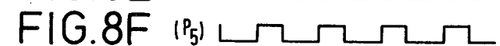
Figure 8G:
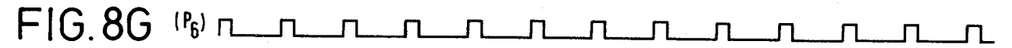
Figure 8H:
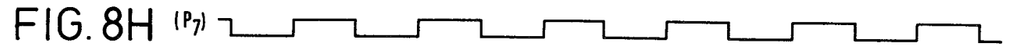
Figures 8I, 8J:
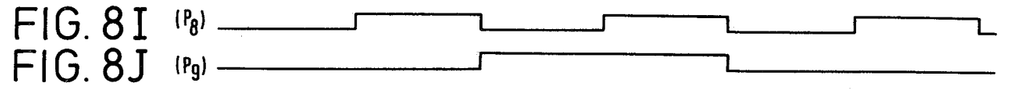
Figure 8K:
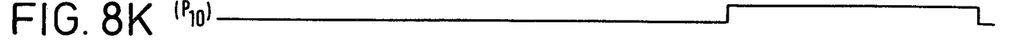

FIG. 7 is a block diagram illustrating a circuit for reproducing the video signal recorded on the magnetic tape, reading out the VITC signal from the video signal and decoding the address.

An input terminal 41 receives a video signal reproduced from the video signal recorded on a track $T_V$. The VITC signal is derived at an output terminal 42 in the following way. First of all, the video signal is fed to a code separator 43. The VITC signal is separated from the video signal by a synchronising signal which is separated from the video signal at the synchronising signal separator 44. There is provided an oscillator 45 which oscillates with a frequency which is n times the colour subcarrier frequency $f_{sc}$ (n is integer, for example, n equals 8).

An output of the oscillator 45 is fed to a hexadecimal counter 46. An output of the hexadecimal counter 46 having a frequency of $f_{sc}/2$ is fed to a decimal counter 47. An output of the decimal counter 47 is fed to a hexadecimal counter 48. Thus, the clock pulse signals $P_1$ and $P_2$ which are the same as used in recording, are obtained from the counter 46, the clock pulse signals $P_3$ to $P_6$ are obtained from the counter 47, and the clock pulse signals $P_7$ to $P_{10}$ are obtained from the counter 48. These pulse signals are synchronised with the VITC signal separated from the reproduced video signal.

Figure 9A:
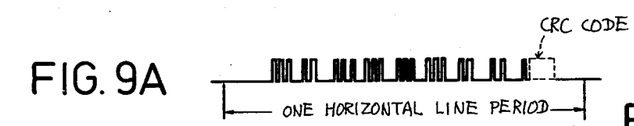
Figure 9B:
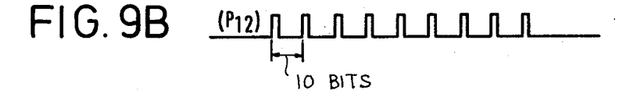
Figure 9C:
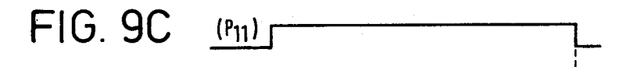

Thus, a mono-stable multivibrator 49 generates a pulse signal $P_{11}$ which is narrower than a horizontal line period but wider than the period where the VITC signal of 90 bits exists as shown in FIG. 9C, while an edge pulse generator 50 generates an edge pulse corresponding to a trailing edge of the VITC signal.

The output of the counter 47 is fed to a synchronising bit gate pulse generator 51 to generate a synchronising bit gate pulse signal $P_{12}$ shown in FIG. 9B which is similar to the clock pulse signal $P_6$ which has a value "1" at the phase corresponding to synchronising signals.

Figure 10A:
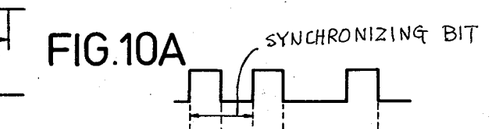
Figure 10B:
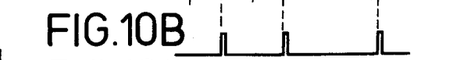
Figures 10C, 10D:
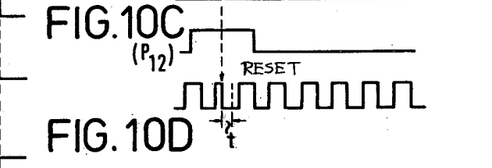

Now, let us assume that the code signal including synchronising signals "10" as shown in FIG. 10A is separated from the video signal. Then the edge pulse generator 50 generates an edge pulse corresponding (synchronised) to the trailing edge of the VITC signal, as shown in FIG. 10B. This edge pulse and the synchronising bit gate pulse signal $P_{12}$ shown in FIG. 10C are fed to an AND-gate 52 to derive only an edge pulse synchronised with the trailing edge of the synchronising bit.

This edge pulse is fed to the counter 46 as a reset pulse through an OR-gate 53 to an AND-gate 54. Accordingly, as shown in FIG. 10D, the phase difference $\tau$ between the output of the counter 46 having a frequency $f_{sc}/2$ and the timing of the VITC signal is corrected and the output of the counter 46 is synchronised with the VITC signal. By the above construction, even when the time base fluctuates from the normal time base by jitter or slow motion reproduction, the timing of the clock pulse is synchronised with the reproduced code. Further, the synchronising signals occur at every ten bits, so it is possible to achieve a very precise synchronisation.

In the above example, the oscillator 45 is a fixed oscillator. However, such an oscillator that is phased locked to, for example, the horizontal synchronising signal of the reproduced video signal, can further widen the extent of the timing that can be synchronised. Then it is possible to read the VITC signal even in still mode reproduction and at the fast mode in which the magnetic tape is run at a speed of several times the normal speed of reproduction. The counters 47 and 48 are reset by the leading edge of the pulse signal $P_{11}$ which is an output of the mono-stable multivibrator 49 through the AND-gate 55.

The output pulses of the counter 46, 47 and 48 are fed to a timing pulse generator 56 to form required timing pulses.

The code signal separated by the code separator 43 and the output pulse of counter 46 are fed to a series-parallel transformation circuit 57 which comprises a shift register to rearrange the code signal except the synchronising bits and CRC code, that is, time codes and user bits (in all 64 bits) into parallel codes, in which each code consists of 4 bits.

These parallel codes are written into a buffer memory 58 of a random access memory and also fed to a code check circuit 59.

Figure 9D:
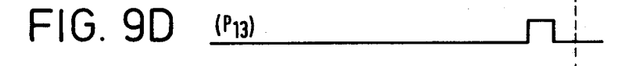
Figure 9E:
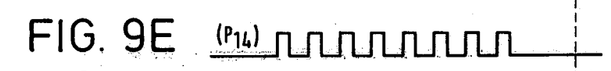

The code check circuit 59 decodes the time code consisting of 4 bits which is supplied from the circuit 57 by the timing pulse signal $P_{14}$, corresponding to the timing of the VITC signal, and shown in FIG. 9E, which is generated by the timing pulse generator 56, and check the decoded numbers to see whether they are possible numbers or not.

The code check circuit 59 generates a signal "1" when the code is correct, and a signal "0" when the code is incorrect. The code signal from the code signal separator 43 is fed to a CRC code check circuit 60. The pulse signal $P_{13}$ shown in FIG. 9D which coincides with the phase of the CRC code generated by the timing pulse generator 56 is fed to the CRC code check circuit 60. In the CRC code check circuit 60, the code signal including the information code and the CRC code (in all 90 bits) is divided by the predetermined code or polynominal (constant) and the remainder is checked. If there is no remainder, the code is correct and the circuit 60 derives a signal "1". When there are remainders, the code is incorrect, and the circuit derives a signal "0". Further, the synchronising signals are separated from the code signal by gating at a gate circuit 61 by the synchronising bit gate pulse signal $P_{12}$ shown in FIG. 9B. The separated synchronising signals are fed to a synchronising signal check circuit 62. Whether the synchronising signals are correct or not, is checked by the synchronising signals from the timing pulse generator 56. If it is correct, the circuit 62 derives a signal "1", if not, it derives a signal "0".

Figures 9G, 9H:
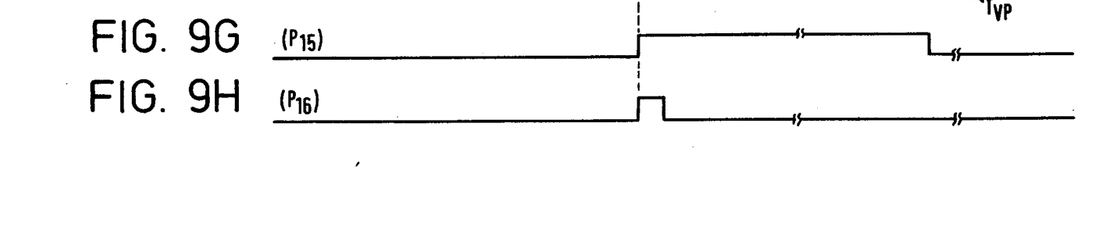

The outputs of the synchronising signal check circuit 62, the code check circuit 59 and the CRC code check circuit 60 are fed to an AND-gate 63. When the output of the AND-gate 63 is "1", which means the code signal is correct, a hold circuit 64 generates a pulse signal $P_{15}$ which is "1" as shown in FIG. 9G by the timing pulse from the timing pulse generator 56. The hold circuit 64 is reset by a vertical synchronising pulse $T_{VP}$ (shown in FIG. 9F) from the vertical synchronising separator 65 which is connected to a synchronising separator 65. The output pulse signal $P_{15}$ of the hold circuit 64 is fed to the AND-gates 54 and 55. Thus, when the pulse signal $P_{15}$ becomes "1", reset of the counters 46, 47 and 48 is inhibited. The pulse signal $P_{15}$ is fed to an AND-gate 66 and a memory pulse generator 67. The AND-gate 61 supplies a writing clock pulse for the buffer memory 58. During the period that the pulse signal $P_{15}$ is "0" codes of 4 bits from the series-parallel transformation circuit 57 are continuously written into the buffer memory 58, but when the pulse signal $P_{15}$ becomes "1", the writing into the memory 58 is inhibited.

The memory pulse generator 67 generates a memory pulse signal $P_{16}$ which coincides the leading edge of the pulse signal $P_{15}$ as shown in FIG. 9G. By feeding the memory pulse signal $P_{16}$ to the AND-gate 68, a writing clock pulse is fed to a buffer memory 60 through the AND-gate 68. Thus, the contents of the buffer memory 58 is transferred to the buffer memory 69. The output data consisting of the time code and the user bits (in all 64 bits) is derived at the output terminal 42 by supplying a read-out address signal through a terminal 70. The read-out data is fed to a display and/or editing apparatus.

As mentioned previously, the VITC signals are inserted into three successive horizontal scanning interval of the vertical blanking period. If the VITC signal inserted in the first horizontal line period is incorrect, the pulse signal $P_{15}$ from the hold circuit 64 does not rise and then the data is not transferred from the buffer memory 58 to the buffer memory 60. The VITC signal of the next horizontal line period is checked in the same manner. Then only the correct VITC signal is stored in the buffer memory 60. The VITC signal may be inserted in any of the intervals so long as it is not in the useful scanning period. Moreover, the number of repetitions of the VITC signal is not restricted.

The above examples of the invention correspond to the NTSC system, so that the bit frequency of the VITC signal is selected as $f_{sc}/2$. However, when video signals of other systems such as the PAL system or other types are utilised, it is necessary to select the bit frequency of the VITC signal in relation to the horizontal frequency, for example as $455f_H/4$, so that all the bits of the VITC signal can be inserted in one horizontal line period.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for reproducing a video signal from a record medium in which each field of the video signal is recorded as a respective video track on the record medium, a frame code signal identifying the frame of the video signal recorded in each video track, a field code signal identifying the field of the video signal recorded in each video track, said field code signal including a bit which changes in level between each field and adjacent fields, said frame code signal including a bit which changes in level between each frame and adjacent frames, means for detecting said bit of said field code signal, means for detecting said bit of said frame code signal, and a direction sensing circuit receiving inputs from said means for detecting said bit of said field code signal and from said means for detecting said bit of said frame code signal and producing an output signal indicative of the transport direction of said record medium.

2. Apparatus for reproducing a video signal according to claim 1 wherein said direction sensing circuit includes a sampling hold circuit which receives an input from said means for detecting said bit of said field code signal, a delay means which receives the output of said means for detecting said bit of said frame code signal, an OR gate which receives outputs of said delay, means and said means for detecting said bit of said frame signal and said OR gate supplying an input to said sampling hold circuit and the output of said sampling hold circuit comprising said output signal which indicates the transport direction of said record medium.

3. Apparatus according to claim 2 including first and second clock pulse sources which are respectively connected to said means for detecting said bit of said field code signal and to said means for detecting said bit of said frame code signal.

4. Apparatus according to claim 2 wherein said gate circuit is an exclusive-OR gate circuit.

* * * * *